United States Patent [19]

Anderson

[11] Patent Number: 4,470,045
[45] Date of Patent: Sep. 4, 1984

[54] DIFFUSION-LIGHTED MAGNETO-OPTIC DISPLAY

[75] Inventor: Robert H. Anderson, Long Beach, Calif.

[73] Assignee: Litton Systems, Inc., Beverly Hills, Calif.

[21] Appl. No.: 375,324

[22] Filed: May 5, 1982

[51] Int. Cl.³ .............................................. G09G 3/20
[52] U.S. Cl. .................................. 340/783; 340/763; 350/388; 350/392
[58] Field of Search ................... 368/82, 84; 350/389, 350/388, 392, 375, 376, 377; 340/783, 784, 763

[56] References Cited
U.S. PATENT DOCUMENTS 3,854,278 12/1974 Takeshita et al. .................. 350/388
3,924,932 12/1975 Yamamoto ........................... 350/392
3,960,438 6/1976 Bonne et al. ........................ 350/388

Primary Examiner—Gerald L. Brigance

[57] ABSTRACT

A magneto-optic display diffusion lighted by incident light. A conventional magneto-optic display comprising a polarization analyzer sheet, a magneto-optic chip, and a polarizer sheet are mounted with the polarizer sheet on the front surface of a transparent slab having a diffusion surface on its back surface. The edges of the slab are adapted to direct incident light against the diffusion surface and cause diffused light to pass out through the magneto-optic display to illuminate it from behind by diffused light. In one embodiment, the edge is a reflective edge. In another embodiment, the edge is a refractive edge.

5 Claims, 5 Drawing Figures

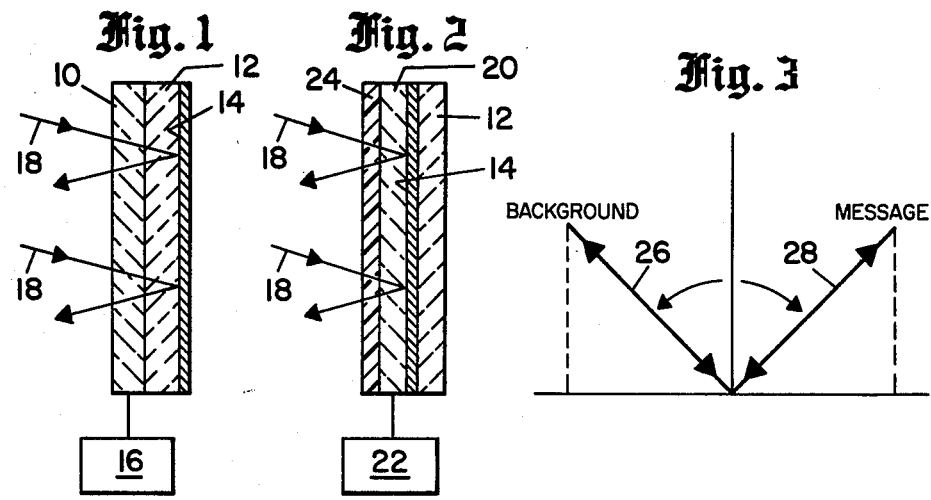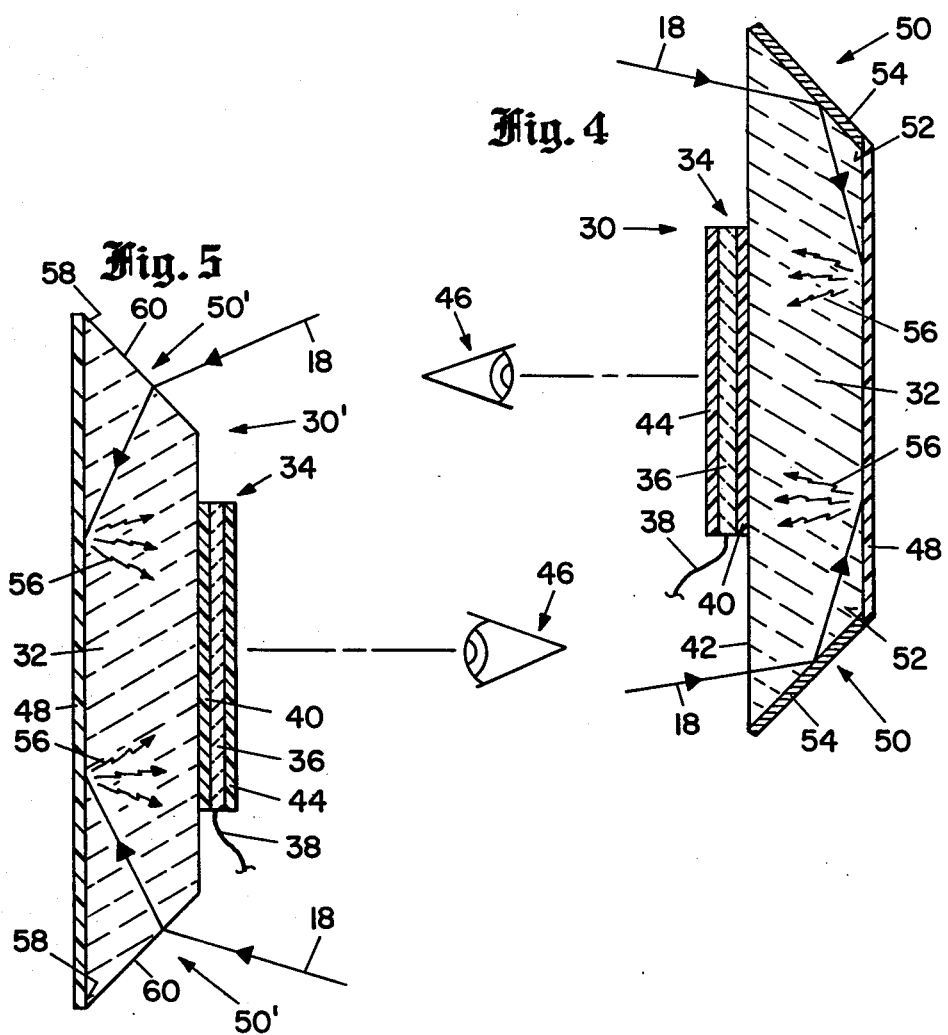

DIFFUSION-LIGHTED MAGNETO-OPTIC DISPLAY

BACKGROUND OF THE INVENTION

The present invention relates to displays and, more particularly, to dynamically changeable displays visible as a result of reflected incident light.

Small displays are incorporated in many small and hand-held devices recently. The most familiar examples are those employed in wristwatches and hand-held calculators. Since most such small devices are battery operated, battery life is a critical factor in the selection of components. Small displays using light emitting diodes produce their own light and are, therefore, viewable in the absence of incident light. On the negative side, however, light emitting diodes consume more energy than other available display types such as liquid crystals. Liquid crystals modify light passing therethrough. For viewing in the absence of incident light, they must be lighted from a separate source. Since most viewing takes place in the presence of available incident light, a liquid crystal display can be configured in the manner of FIG. 1 wherein the liquid crystal display 10 has a mirror 12 containing reflective surface 14 attached on the back side. The liquid crystal display 10 is connected to be driven by the control circuit 16. Incident light 18 passes through the liquid crystal display, reflects off the reflective surface 14 of mirror 12 and passes back through the liquid crystal display 10 to be viewed by the viewer whereby the display information impressed on the liquid crystal display 10 by the control circuit 16 can be viewed.

Recently, magneto-optic displays of the type described in my co-pending applications titled SWITCHABLE TANDEM MEMORY MAGNETO-OPTIC DISPLAY and MAGNETO-OPTIC DISPLAY being Ser. Nos. 375,322 and 375,325, respectively, which were filed on even date herewith and are assigned to the assignee of this application, have gained rapid popularity. The chip is divided into a rectangular pattern of posts with appropriate control wires disposed therebetween. Each individual post is addressible and can be magnetized in either of two directions. Depending on the direction of magnetization, polarized light passing therethrough is rotated clockwise or counter-clockwise a fixed amount by the Faraday effect. By viewing the display through a polarized sheet having its polarization axis properly aligned, the rotated light is placed closer to or further from axial alignment with the polarization axis of the analyzer sheet to, thereby, appear lighter or darker, respectively. Because of their mode of operation, such displays have been thought to be unusable in the manner of the liquid crystal display described in FIG. 1. If, as shown in FIG. 2, a magneto-optic chip 20 connected to a driver circuit 22 with a polarizing sheet 24 placed over its front surface and a mirror 12 having a reflective surface 14 placed adjacent its back surface has incident light 18 reflected back through it in the manner of the liquid crystal display 10, the display information on the magneto-optic chip will be invisible. The reason for this can be seen with reference to FIG. 3. Assuming that the polarizer 24 sets the polarization axis at 0° and the magneto-optic chip 20 is imparting a 10° rotation in either direction, after passing through the chip 20, the rotated portions of the potential display will be offset at +10° and −10°, respectively. After reflecting off the mirror reflective surface 14, no rotation will be imparted so that the axial orientation will still be at +10° and −10°, respectively. In passing back through the magneto-optic chip 20, a further 10° of rotation will be effected in the same direction, as is charateristic of such chips. Thus, upon being viewed through the polarizer 24, the light will be rotated to an axial orientation of +20° and −20°, respectively, with respect to the polarizer sheet's 0° axial orientation; that is, both the background areas and the message areas will be offset equally in opposite directions from the vertical. The contrast between the background and message required for the message to be viewed is a function of the cosine of the offset angle. The cosine of +20° and the cosine of −20° are both 0.94. This can be seen visually in FIG. 3 where the background and the message axial orientations have equal projections on the horizontal axis.

One novel method of providing a front-lighted display of this type is shown in my co-pending application titled FRONT-LIGHTED MAGNETO-OPTIC DISPLAY, Ser. No. 375,323, also filed on even date herewith and assigned to the assignee of this application.

It is the object of the present invention to provide another magneto-optic display which is viewable as a result of incident front light only.

SUMMARY

The foregoing objective has been met in the diffusion-lighted magneto-optic display of the present invention comprising, in sequence, a polarization analyzer sheet; a magneto-optic chip adapted to be connected to and driven by a display driver; a polarizer sheet; and, a slab of transparent material such as plastic or glass having a light colored diffusion surface on the back surface thereof and means at the periphery for directing front incident light into the slab and against the diffusion surface to cause diffused light from the diffusion surface to pass, in sequence, through the polarizer sheet, the magneto-optic chip and the polarization analyzer sheet to the eyes of the viewer.

In one embodiment, this is achieved by having a portion of the periphery of the slab at an acute angle with respect to the diffusion surface such that incident light striking that portion is refracted against the diffusion surface.

In an alternate embodiment, the portion of the periphery of the slab is at an obtuse angle and has a reflective back surface such that the incident light is reflected against the diffusion surface.

DESCRIPTION OF THE DRAWINGS

FIG. 1 is a simplified cutaway side elevation of a prior art liquid crystal display viewable with incident light.

FIG. 2 is a simplified cutaway side elevation through an unworkable magneto-optic chip with a reflective surface intended for viewing under incident light when constructed in the manner of the display of FIG. 1.

FIG. 3 is a graphic representation of the angular offset of polarized light for background areas and message areas in the unworkable magneto-optic chip display of FIG. 2.

FIG. 4 is a simplified cutaway side elevation through a display according to the present invention in a first embodiment.

FIG. 5 is a simplified cutaway side elevation through a magneto-optic display according to the present invention in a second embodiment.

DESCRIPTION OF THE TWO EMBODIMENTS

Turning first to FIG. 4, a display assembly 30 according to the present invention in a first embodiment is shown. Display 30 comprises a slab 32 of a transparent material such as glass or plastic having a conventional magneto-optic display 34 attached to the front surface thereof with an optical cement such as that described in detail in my aforementioned co-pending application which is incorporated herein by reference. Briefly, the term is used broadly to mean a fairly clear, water-white non-diffusing material which wets and adheres to the adjacent surfaces, and has an index of refraction generally comparable to the adjacent layers, thereby reducing surface reflection. Such materials should be used throughout the display 34 to reduce reflection which can otherwise pose a considerable problem as described in that co-pending application. The magneto-optic display 34 comprises a magneto-optic chip 36 adapted to be connected to a driver by the control wires 38. A polarizer sheet 40 is placed adjacent the front surface 42 of the slab 32 and a polarization analyzer sheet 44 covers the outer surface of the magneto-optic chip 36 closest to the viewer 46. The rear surface of the slab 32 is covered with a diffusing material 48 being light-colored, white, or metallic. In this embodiment, the edges 52 of the slab form an obtuse angle with the rear surface of the slab at locations 50. Edges 50 are further covered with a reflective material 54. The obtuse angle at 52 can be 135°. This configuration results in incident light 18 striking the reflective surface 54 and being reflected against the diffusion material 48 to cause diffused light 56 to radiate from the diffusing material 48 and pass outward through first the polarizer sheet 40, then the magneto-optic chip 36, and then the polarization analyzer sheet 44 to operate the magneto-optic display 34 in the conventional backlighted manner for viewing of the information contained therein by the viewer 46.

Turning now to FIG. 5, an alternate embodiment 30' is shown. The construction is basically the same with the exception that the edges 50' meet the back surface of the slab 32 in an acute angle of about 45° at location 58. Additionally, they have no reflective surface but, rather, are treated with an anti-glare material on surface 60 in a manner well known in the art so as to promote the entry of incident light 18 into the slab 32 to thereafter be refracted against the diffusing material 48 to cause the emanation of diffused light 56 in the manner of the previously described embodiment.

Wherefore, having thus described my invention, I claim:

1. A diffusion-lighted display comprising:
   (a) a magneto-optic display unit including:
      (1) a polarization analyzer sheet;
      (2) a magneto-optic chip adapted to be connected to and driven by a display driver; and
      (3) a polarizer sheet;
   (b) a slab of transparent material having said polarizer sheet of said magneto-optic display unit adjacent the front surface thereof and a light colored diffusion surface on the back surface thereof; and
   (c) said slab having light directing means at the periphery thereof for directing front incident light into said slab and against said diffusion surface to cause diffused light from said diffusion surface to pass through said magmagneto-optic display unit.

2. The display of claim 1 wherein:
   said light directing means comprises a portion of the periphery of said slab being angled at an acute angle with respect to said diffusion surface such that incident light striking said portion is refracted against said diffusion surface.

3. The display of claim 1 wherein:
   said light directing means comprises a portion of the periphery of said slab being angled at an obtuse angle with respect to said diffusion surface and has a reflective back surface such that incident light striking said portion passes into said portion and is reflected from said reflective surface against said diffusion surface.

4. The display of claim 1 in which said polarizer sheet is linear.

5. The display of claim 1 in which said incident light originates from a source generally in front of said magneto-optic display unit and, therefore, in front of said slab front surface.

* * * * *